(12) United States Patent
Koo et al.

(10) Patent No.: US 12,498,511 B2
(45) Date of Patent: Dec. 16, 2025

(54) POLARIZING PLATE AND OPTICAL DISPLAY COMPRISING THE SAME

(71) Applicant: SAMSUNG SDI CO., LTD., Yongin-si (KR)

(72) Inventors: Jun Mo Koo, Suwon-si (KR); Bong Choon Kim, Suwon-si (KR); Sang Hum Lee, Suwon-si (KR); Jung Hun You, Suwon-si (KR); Hee Seop Kim, Suwon-si (KR); Kwang Ho Shin, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 1142 days.

(21) Appl. No.: 17/464,524

(22) Filed: Sep. 1, 2021

(65) Prior Publication Data

US 2022/0075108 A1  Mar. 10, 2022

(30) Foreign Application Priority Data

Sep. 4, 2020  (KR) .................. 10-2020-0113234

(51) Int. Cl.
| | |
|---|---|
| *G02B 5/30* | (2006.01) |
| *C08J 5/18* | (2006.01) |
| *C08L 1/12* | (2006.01) |
| *C08L 25/18* | (2006.01) |
| *G02B 1/02* | (2006.01) |

(Continued)

(52) U.S. Cl.
CPC ............. *G02B 5/3083* (2013.01); *C08J 5/18* (2013.01); *C08L 1/12* (2013.01); *C08L 25/18* (2013.01); *G02B 1/02* (2013.01); *G02B 1/04* (2013.01); *C08J 2301/12* (2013.01);
(Continued)

(58) Field of Classification Search
CPC ......... G02B 1/04; G02B 27/286; C08L 25/06; G02F 1/133541; G02F 1/13363; G02F 2413/12
See application file for complete search history.

(56) References Cited

U.S. PATENT DOCUMENTS

| | | |
|---|---|---|
| 10,209,416 B2 | 2/2019 | Jeon et al. |
| 11,237,311 B2 | 2/2022 | Lee et al. |

(Continued)

FOREIGN PATENT DOCUMENTS

| | | | |
|---|---|---|---|
| CN | 111263904 A | 6/2020 | |
| CN | 114137648 B | * 12/2024 | ........... G02B 5/3083 |

(Continued)

OTHER PUBLICATIONS

Korean Office Action issued Sep. 19, 2023, in corresponding Korean Patent Application No. 10-2020-0113234 (6 pages).

(Continued)

*Primary Examiner* — Sophie Hon
(74) *Attorney, Agent, or Firm* — Ricky Lam

(57) ABSTRACT

A polarizing plate and an optical display including the same are provided. A polarizing plate includes a polarizer; and a first retardation layer and a second retardation layer sequentially stacked on a lower surface of the polarizer, and the first retardation layer has a degree of biaxiality (NZ) of less than 0 at a wavelength of 550 nm and is a non-liquid crystal layer, and the second retardation layer has a degree of biaxiality (NZ) of greater than 1 at a wavelength of 550 nm.

22 Claims, 1 Drawing Sheet

(51) Int. Cl.
  *G02B 1/04* (2006.01)
  *G02B 1/14* (2015.01)
  *H10K 59/80* (2023.01)

(52) U.S. Cl.
  CPC ....... *C08J 2325/18* (2013.01); *C08L 2203/16* (2013.01); *G02B 1/14* (2015.01); *H10K 59/8792* (2023.02)

(56) References Cited

U.S. PATENT DOCUMENTS

| | | | |
|---|---|---|---|
| 2018/0044444 A1* | 2/2018 | Zhang | C08F 8/20 |
| 2018/0203174 A1* | 7/2018 | Lee | H10K 59/8791 |
| 2020/0285093 A1 | 9/2020 | Choi et al. | |
| 2021/0013276 A1* | 1/2021 | Kim | G02B 5/3041 |

FOREIGN PATENT DOCUMENTS

| | | |
|---|---|---|
| KR | 10-2010-0064522 A | 6/2010 |
| KR | 10-2013-0070559 A | 6/2013 |
| KR | 10-2013-0103595 A | 9/2013 |
| KR | 10-2018-0083761 A | 7/2018 |
| KR | 10-2019-0030237 A | 3/2019 |
| KR | 10-2019-0120925 A | 10/2019 |
| KR | 10-2020-0081155 A | 7/2020 |
| WO | WO-2019203562 A1 * 10/2019 ........... G02B 5/3041 |

OTHER PUBLICATIONS

Korean Office Action dated May 29, 2024, issued in corresponding Korean Patent Application No. 10-2020-0113234 (6 pages).
Chinese Office Action issued Jan. 27, 2024, in corresponding Chinese Patent Application No. 202111034265.X (7 pages).

* cited by examiner

POLARIZING PLATE AND OPTICAL DISPLAY COMPRISING THE SAME

CROSS-REFERENCE TO RELATED APPLICATION

This application claims priority to and the benefit of Korean Patent Application No. 10-2020-0113234, filed on Sep. 4, 2020 in the Korean Intellectual Property Office, the entire disclosure of which is incorporated herein by reference.

BACKGROUND

1. Field

Aspects of embodiments of the present invention relate to a polarizing plate and an optical display including the same.

2. Description of the Related Art

An organic light emitting diode display can suffer from deterioration in visibility and contrast due to reflection of external light. In order to solve this problem, the organic light emitting diode display may employ polarizing plates each including a polarizer and a retardation film, thereby realizing an antireflection function by preventing or substantially preventing the reflected external light from leaking therefrom.

The polarizing plate aims to reduce lateral reflectivity and front reflectivity. To this end, the polarizing plate generally includes two retardation layers on a lower surface of the polarizer. In recent years, with an increasing trend of improving thickness reduction and processability of the polarizing plate, there is a need for improvement in thickness reduction and processability while reducing reflectivity thereof. On the other hand, there is a technique of reducing reflectivity through a pattern layer on the lower surface of the polarizer. However, since the pattern layer is required to have a certain (e.g., predetermined) thickness and height, the pattern layer is not suited for the trend of reducing the thickness of the polarizing plate and requires an additional process, thereby decreasing processability.

The background technique of the present invention is disclosed in Korea Patent Publication No. 10-2013-0103595 and the like.

SUMMARY

According to an aspect of embodiments of the present invention, a polarizing plate that has a good effect in thickness reduction while significantly reducing front reflectivity and lateral reflectivity is provided.

According to another aspect of embodiments of the present invention, a polarizing plate having good processability is provided.

According to another aspect of embodiments of the present invention, a polarizing plate with improved black visibility is provided.

According to another aspect of embodiments of the present invention, an optical display including the polarizing plate is provided.

According to one or more embodiments of the present invention, a polarizing plate includes a polarizer; and a first retardation layer and a second retardation layer sequentially stacked on a lower surface of the polarizer, wherein the first retardation layer has a degree of biaxiality (NZ) of less than 0 at a wavelength of 550 nm and is a non-liquid crystal layer, and the second retardation layer has a degree of biaxiality (NZ) of greater than 1 at a wavelength of 550 nm.

In one or more embodiments, the degree of biaxiality (NZ) of the first retardation layer is −3 to less than 0 at a wavelength of 550 nm and the degree of biaxiality (NZ) of the second retardation layer is greater than 1 to 2 at a wavelength of 550 nm.

In one or more embodiments, the first retardation layer may have a greater absolute out-of-plane retardation (Rth) at a wavelength of 550 nm than the second retardation layer.

In one or more embodiments, the first retardation layer may have an out-of-plane retardation (Rth) of −250 nm to −50 nm at a wavelength of 550 nm, and the second retardation layer may have an out-of-plane retardation (Rth) of 40 nm to 150 nm at a wavelength of 550 nm.

In one or more embodiments, a laminate of the first retardation layer and the second retardation layer or a laminate including the first retardation layer and the second retardation layer may be stacked on the lower surface of the polarizer and may have an out-of-plane retardation (Rth) of −150 nm to −10 nm at a wavelength of 550 nm.

In one or more embodiments, the first retardation layer may have a greater absolute in-plane retardation (Re) at a wavelength of 550 nm than the second retardation layer.

In one or more embodiments, the first retardation layer may have Re of 100 nm to 270 nm at a wavelength of 550 nm, and the second retardation layer may have an in-plane retardation (Re) of 70 nm to 160 nm at a wavelength of 550 nm.

In one or more embodiments, the first retardation layer may have negative (−) birefringence, and the second retardation layer may have positive (+) birefringence.

In one or more embodiments, the first retardation layer may have Rth/d of −50 nm/μm to −10 nm/μm, where Rth is the out-of-plane retardation (unit: nm) of the first retardation layer at a wavelength of 550 nm, and d is a thickness (unit: μm) of the first retardation layer.

In one or more embodiments, the first retardation layer may exhibit positive dispersion, and the second retardation layer may exhibit positive dispersion.

In one or more embodiments, the first retardation layer may have a thickness of 15 μm or less, and the second retardation layer may have a thickness of 10 μm or more.

In one or more embodiments, the first retardation layer may include at least one selected from among a cellulose ester compound or a polymer thereof and an aromatic compound or a polymer thereof.

In one or more embodiments, the aromatic compound may include a polystyrene compound including a moiety represented by the following Formula 2:

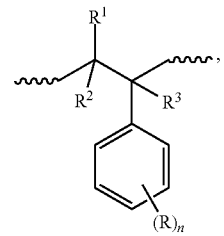

where ⌇⌇⌇ is a linking site of an atom; $R^1$, $R^2$, and $R^3$ are each independently a hydrogen atom, an alkyl group, a substituted alkyl group, or a halogen; R is each independently a substituent group on a styrene ring; and n is an integer of 0 to 5 indicating the number of substituent groups on the styrene ring.

In one or more embodiments, the moiety of Formula 2 may include a halogen.

In one or more embodiments, the first retardation layer may be directly formed on a lower surface of the second retardation layer without an adhesive layer therebetween.

In one or more embodiments, the second retardation layer may be a non-liquid crystal layer.

In one or more embodiments, the first retardation layer may have a slow axis tilted at an angle of +5° to +25° or at an angle of −25° to −5° with reference to a transmission axis of the polarizer, and the second retardation layer may have a slow axis tilted at an angle of +50° to +80° or at an angle of −80° to −50° with reference to the transmission axis of the polarizer.

In one or more embodiments, the polarizing plate may further include a protective layer on an upper surface of the polarizer.

In one or more embodiments, the polarizing plate may further include a third retardation layer including a positive C layer having an out-of-plane retardation Rth of −300 nm to 0 nm at a wavelength of 550 nm.

In one or more embodiments, the third retardation layer may be stacked between the polarizer and the first retardation layer or on a lower surface of the second retardation layer.

In one or more embodiments, the polarizing plate may further include a light absorbent-containing layer.

In one or more embodiments, the light absorbent-containing layer may contain 0.001 wt % to 6 wt % of a light absorbent having a maximum absorption wavelength of 380 nm to 450 nm.

In one or more embodiments, the light absorbent-containing layer may be on an upper surface of the protective layer that is on the upper surface of the polarizer, between the polarizer and the protective layer, between the polarizer and the first retardation layer, between the first retardation layer and the second retardation layer, and/or on a lower surface of the second retardation layer.

According to one or more embodiments of the present invention, an optical display includes the polarizing plate according to an embodiment of the present invention.

DETAILED DESCRIPTION OF THE INVENTION

Figure 1:
FIG. 1 is a cross-sectional view of a polarizing plate according to an embodiment of the present invention.

Herein, some embodiments of the present invention will be described in further detail with reference to the accompanying drawings to provide thorough understanding of the invention to those skilled in the art. It is to be understood that the present invention may be embodied in different ways and is not limited to the following embodiments.

In the drawings, components unrelated to description may be omitted for clear description of the invention, and like components will be denoted by like reference numerals throughout the specification. Although lengths, thicknesses or widths of various components may be exaggerated for understanding in the drawings, the present invention is not limited thereto. Herein, spatially relative terms, such as "upper" and "lower," are defined with reference to the accompanying drawings. Thus, it is to be understood that the term "upper surface" can be used interchangeably with the term "lower surface."

Herein, "in-plane retardation Re," "out-of-plane retardation Rth," and "degree of biaxiality (NZ)" are represented by the following Equations A, B, and C, respectively:

$$Re = (nx - ny) \times d, \quad (A)$$

$$Rth = ((nx + ny)/2 - nz) \times d, \quad (B)$$

$$NZ = (nx - nz)/(nx - ny), \quad (C)$$

where nx, ny, and nz are indexes of refraction of a corresponding optical device in the slow axis direction, the fast axis direction, and the thickness direction of the optical device at a measurement wavelength, respectively, and d is the thickness thereof (unit: nm). In Equations A to C, the measurement wavelength may be 450 nm, 550 nm, or 650 nm.

Herein, "short wavelength dispersion" refers to Re(450)/Re(550) and "long wavelength dispersion" refers to Re(650)/Re(550), wherein Re(450), Re(550), and Re(650) refer to in-plane retardations (Re) of a single retardation layer or a laminate of retardation layers at wavelengths of about 450 nm, about 550 nm, and about 650 nm, respectively.

As used herein to represent an angle, "+" means a clockwise direction about a reference, and "−" means a counterclockwise direction about the reference.

As used herein to represent a specific numerical range, the expression "X to Y" means "greater than or equal to X and less than or equal to Y (X≤ and ≤Y)."

Embodiments of the present invention relate to a polarizing plate, which includes a first retardation layer and a second retardation layer sequentially stacked on a lower surface of a polarizer. The polarizing plate according to the present invention can reduce front reflectivity and lateral reflectivity at any wavelengths and can improve the degree of circular polarization at a lateral side and processability by eliminating an adhesive layer between the first retardation layer and the second retardation layer while achieving thickness reduction of the polarizing plate. In an embodiment, the polarizing plate may have a degree of circular polarization of 65% or more, for example, 65% to 75%, a front reflectivity of 0.25% or less, for example, 0% to 0.25%, and a lateral reflectivity of 0.55% or less, for example, 0% to 0.55%. Within this range, the polarizing plate can improve screen quality without screen unbalance between a front surface and a side surface. Although the polarizing plate may further include a pattern layer on a lower surface of the polarizer, the polarizing plate according to the present invention can achieve thickness reduction and improvement in processability even without the pattern layer by realizing the effects of the present invention.

Next, a polarizing plate according to an embodiment of the present invention will be described with reference to FIG. 1.

Referring to FIG. 1, the polarizing plate according to an embodiment includes a polarizer 110, a protective layer 140 stacked on an upper surface of the polarizer 110, and a first retardation layer 120 and a second retardation layer 130 sequentially stacked on a lower surface of the polarizer 110 in the stated order from the polarizer 110.

First Retardation Layer and Second Retardation Layer

The first retardation layer 120 has a degree of biaxiality (NZ) of less than 0 at a wavelength of 550 nm, and the second retardation layer 130 has a degree of biaxiality (NZ) of greater than 1 at a wavelength of 550 nm. With the first retardation layer 120 and the second retardation layer 130 satisfying the degree of biaxiality as set forth above, the polarizing plate can achieve substantial improvement in screen quality by remarkably reducing lateral reflectivity.

In an embodiment, the first retardation layer 120 may have a degree of biaxiality (NZ) of −3 to less than 0 at a wavelength of 550 nm, for example, −2, −1.9, −1.8, −1.7, −1.6, −1.5, −1.4, −1.3, −1.2, −1.1, −1.0, −0.9, −0.8, −0.7, −0.6, −0.5, −0.4, −0.3, −0.2, −0.1, −0.05, or −0.01, and, in an embodiment, −2 to −0.05. In an embodiment, the second retardation layer 130 may have a degree of biaxiality (NZ) of greater than 1 to 3 at a wavelength of 550 nm, for example, 1.05, 1.1, 1.2, 1.3, 1.4, 1.5, 1.6, 1.7, 1.8, 1.9, or 2, and, in an embodiment, 1.05 to 2, and, in an embodiment, 1.05 to 1.5.

The first retardation layer 120 may have a greater absolute out-of-plane retardation Rth at a wavelength of 550 nm than the second retardation layer 130. As described below, a laminate of the first retardation layer 120 and the second retardation layer 130 is formed to have a negative (−) Rth at a wavelength of 550 nm, whereby the polarizing plate can remarkably reduce lateral reflectivity, thereby remarkably improving screen quality of a display apparatus.

The first retardation layer 120 has a negative (−) Rth at a wavelength of 550 nm, and the second retardation layer 130 a positive (+) Rth at a wavelength of 550 nm. Accordingly, the laminate of the first retardation layer 120 and the second retardation layer 130 is an antireflection film and has a negative (−) Rth at a wavelength of 550 nm, thereby remarkably improving lateral reflectivity. As compared with a polarizing plate in which a retardation layer alone or a laminate of retardation layers is stacked on the lower surface of the polarizer and has a positive (+) Rth at a wavelength of 550 nm, the polarizing plate in which the laminate of the first and second retardation layers has a negative (−) Rth at a wavelength of 550 nm can further reduce lateral reflectivity, thereby further improving screen quality of the display apparatus.

In an embodiment, the laminate of the first retardation layer 120 and the second retardation layer 130 or a laminate stacked on the lower surface of the polarizer and including the first retardation layer 120 and the second retardation layer 130 may have Rth of −150 nm to −10 nm at a wavelength of 550 nm, for example, −150 nm, −140 nm, −130 nm, −120 nm, −110 nm, −100 nm, −90 nm, −80 nm, −70 nm, −60 nm, −50 nm, −40 nm, −30 nm, −20 nm, or −10 nm, and, in an embodiment, −80 nm to −20 nm, and, in an embodiment, −70 nm to −25 nm. Within this range, the polarizing plate can achieve remarkable reduction in lateral reflectivity of the display apparatus and color deviation between azimuths at side surfaces thereof.

In an embodiment, the first retardation layer 120 may have Rth of −250 nm to −50 nm at a wavelength of 550 nm, for example, −250 nm, −240 nm, −230 nm, −220 nm, −210 nm, −200 nm, −190 nm, −180 nm, −170 nm, −160 nm, −150 nm, −140 nm, −130 nm, −120 nm, −110 nm, −100 nm, −90 nm, −80 nm, −70 nm, −60 nm, or −50 nm, and, in an embodiment, −150 nm to −60 nm, and, in an embodiment, −130 nm to −80 nm. Within this range, the first retardation layer 120 allows the laminate of the first and second retardation layers to easily reach the above Rth value at a wavelength of 550 nm while reducing lateral reflectivity of the display apparatus.

In an embodiment, the second retardation layer 130 may have Rth of 40 nm to 150 nm at a wavelength of 550 nm, for example, 40 nm, 50 nm, 60 nm, 70 nm, 80 nm, 90 nm, 100 nm, 110 nm, 120 nm, 130 nm, 140 nm, or 150 nm, and, in an embodiment, 45 nm to 100 nm, and, in an embodiment, 50 nm to 70 nm. Within this range, the second retardation layer 130 allows the laminate of the first and second retardation layers to easily reach the above Rth value at a wavelength of 550 nm while reducing lateral reflectivity of the display apparatus.

The first retardation layer 120 may be formed of at least one first material having negative (−) birefringence.

Herein, "having negative birefringence" means that, as elongation of a non-stretched film or coating formed by coating and drying the corresponding material is increased upon stretching the non-stretched film or coating, in-plane retardation Re of the non-stretched film or coating at a wavelength of 550 nm is increased whereas out-of-plane retardation Rth thereof at a wavelength of 550 nm is decreased (that is, Rth becomes a negative value (−) and an absolute value of Rth increases). With the first retardation layer 120 formed of at least one first material having negative birefringence, the laminate of the first retardation layer 120 and the second retardation layer 130 can easily achieve the above Rth value at a wavelength of 550 nm.

The second retardation layer 130 may be formed of at least one second material having positive (+) birefringence.

Herein, "having positive birefringence" means that, as elongation of a non-stretched film or coating formed by coating and drying the corresponding material is increased upon stretching the non-stretched film or coating, both in-plane retardation Re and out-of-plane retardation Rth of the non-stretched film or coating at a wavelength of 550 nm are increased (that is, Rth becomes a positive value (+) and an absolute value of Rth increases). With the second retardation layer 130 formed of at least one second material having positive birefringence, the laminate of the first retardation layer 120 and the second retardation layer 130 can easily achieve the above Rth value at a wavelength of 550 nm.

In an embodiment, the first retardation layer 120 may have a greater absolute in-plane retardation Re at a wavelength of 550 nm than the second retardation layer 130. With this structure, the polarizing plate can achieve further reduction in lateral reflectivity of the display apparatus.

In an embodiment, the first retardation layer 120 may have Re of 100 nm to 270 nm at a wavelength of 550 nm, for example, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, or 270 nm, and, in an embodiment, 100 nm to 200 nm, and, in an embodiment, 150 nm to 180 nm. Within this range, the first retardation layer 120 can secure thickness reduction of the polarizing plate and optimal Rth of the laminate through reduction in an amount of materials used for the polarizing plate.

In an embodiment, the second retardation layer 130 may have Re of 70 nm to 160 nm at a wavelength of 550 nm, for example, 70 nm, 80 nm, 90 nm, 100 nm, 110 nm, 120 nm, 130 nm, 140 nm, 150 nm, or 160 nm, and, in an embodiment, 80 nm to 130 nm. Within this range, the second retardation layer 130 can secure thickness reduction of the polarizing plate and optimal Rth of the laminate through reduction in an amount of materials used for the polarizing plate.

In an embodiment, the first retardation layer 120 exhibits positive dispersion, the laminate of the first retardation layer 120 and the second retardation layer 130 exhibits negative dispersion, thereby reducing lateral reflectivity.

The first retardation layer 120 may have a short wavelength dispersion of 1 to 1.2 and a long wavelength dispersion of 0.9 to 1. Within this range, the polarizing plate can reduce reflectivity at front and lateral sides in use. In an embodiment, the first retardation layer has a short wavelength dispersion of 1 to 1.1 and a long wavelength dispersion of 0.95 to 1.

In an embodiment, the first retardation layer 120 may have an in-plane retardation Re of 130 nm to 250 nm at a wavelength of 450 nm, and, in an embodiment, 150 nm to 230 nm, and, in an embodiment, 160 nm to 220 nm, and an in-plane retardation Re of 120 nm to 240 nm at a wavelength of 650 nm, and, in an embodiment, 140 nm to 220 nm, and, in an embodiment, 150 nm to 210 nm. Within this range, the first retardation layer 120 can easily achieve the desired short wavelength dispersion and the desired long wavelength dispersion.

The second retardation layer 130 exhibits positive dispersion, and the laminate of the first retardation layer 120 and the second retardation layer 130 exhibits negative dispersion, thereby reducing lateral reflectivity.

In an embodiment, the second retardation layer 130 may have a short wavelength dispersion of 1 to 1.1 and a long wavelength dispersion of 0.96 to 1. Within this range, a difference in wavelength dispersion between the first retardation layer 120 and the second retardation layer 130 can be reduced to improve the degree of circular polarization at each wavelength, thereby improving reflectivity.

In an embodiment, the second retardation layer 130 may have an in-plane retardation Re of 80 nm to 120 nm at a wavelength of 450 nm, and, in an embodiment, 85 nm to 115 nm, and, in an embodiment, 90 nm to 110 nm, and an in-plane retardation Re of 80 nm to 110 nm at a wavelength of 650 nm, and, in an embodiment, 85 nm to 105 nm. Within this range, the second retardation layer 130 can easily achieve the short wavelength dispersion and the long wavelength dispersion, as set forth above.

The first retardation layer 120 is a non-liquid crystal layer. Here, the "non-liquid crystal layer" may mean a layer which is formed of a composition free from at least one selected from among a liquid crystal polymer and a liquid crystal copolymer. The liquid crystal polymer and the liquid crystal copolymer refer to materials formed of a mesogen compound and may have a bar shape, a rod shape, and a disk shape, without being limited thereto.

In an embodiment, the first retardation layer 120 may have a thickness of 15 μm or less, that is, greater than 0 μm to 15 μm or less, and, in an embodiment, 3 μm to 15 μm. Within this range, the first retardation layer 120 can have a thin thickness and can achieve the above retardation.

As described above, the laminate of the first retardation layer 120 and the second retardation layer 130 may be formed by coating and drying a composition for the first retardation layer 120 on an upper surface of the second retardation layer 130 to form a coating layer for the first retardation layer, followed by concurrently (e.g., simultaneously) stretching the coating layer and the second retardation layer. Typically, each of the first retardation layer 120 and the second retardation layer 130 is formed of a liquid crystal film or a liquid crystalline polymer, which requires an adhesive layer or a bonding layer between the first retardation layer and the second retardation layer, thereby deteriorating productivity of the polarizing plate and failing to suppress effects of an adhesive layer or a bonding layer. On the other hand, when the first retardation layer is formed by coating a composition comprising the liquid crystalline polymer on the upper surface of the second retardation layer, the polarizing plate requires a separate alignment layer for alignment of liquid crystal, thereby causing a problem of separation between the first retardation layer and the alignment layer and between the alignment layer and the second retardation layer.

In an embodiment, the polarizing plate according to the present invention may be free from an alignment layer.

In an embodiment, the first retardation layer 120 may be directly formed on the upper surface of the second retardation layer 130. Herein, "directly formed" means that neither an adhesive layer nor a bonding layer is interposed between the first retardation layer 120 and the second retardation layer 130.

According to the present invention, the first retardation layer 120 composed of the non-liquid crystal layer can prevent or substantially prevent the aforementioned problems and can improve processability of the polarizing plate while achieving thickness reduction of the polarizing plate. According to the present invention, the first retardation layer 120 is formed of the first material described below, thereby satisfying the above Rth at a wavelength of 550 nm with the non-liquid crystal layer of the first retardation layer 120.

In an embodiment, the second retardation layer 130 may be a non-liquid crystal layer. The second retardation layer 130 is composed of the non-liquid crystal layer, thereby facilitating manufacture of the first retardation layer 120 and/or the first retardation layer 120 and the second retardation layer 130.

In an embodiment, the second retardation layer 130 may have a greater thickness than the first retardation layer 120.

In an embodiment, the second retardation layer 130 may have a thickness of 10 μm or more, and, in an embodiment, 10 μm to 30 μm. Within this range, the coating layer can secure uniform or substantially uniform coating while acting as a support for realization of uniform retardation on the overall width of the polarizing plate.

In an embodiment, the second retardation layer 130 may include a stretched polymer film formed of an optically transparent resin. For example, the second retardation layer 130 may be formed of at least one resin selected from among cellulose resins including triacetylcellulose (TAC) and the like, polyester resins including polyethylene terephthalate, polybutylene terephthalate, polyethylene naphthalate (PEN), polybutylene naphthalate, and the like, cyclic polyolefin (COP) resins, polycarbonate resins, polyether sulfone resins, polysulfone resins, polyamide resins, polyimide resins, polyolefin resins, polyarylate resins, polyvinyl alcohol resins, polyvinyl chloride resins, polyvinylidene chloride resins, and acryl resins. In an embodiment, the second retardation layer 130 may include a stretched cyclic polyolefin, polycarbonate, or acryl film. In an embodiment, the cyclic polyolefin (COP) film can provide an effect in improvement of front reflectivity of the polarizing plate according to the present invention.

In an embodiment, the first retardation layer 120 may have Rth/d of −50 nm/μm to −10 nm/μm, for example, −50 nm/μm, −49 nm/μm, −48 nm/μm, −47 nm/μm, −46 nm/μm, −45 nm/μm, −44 nm/μm, −43 nm/μm, −42 nm/μm, −41 nm/μm, −40 nm/μm, −39 nm/μm, −38 nm/μm, −37 nm/μm, −36 nm/μm, −35 nm/μm, −34 nm/μm, −33 nm/μm, −32 nm/μm, −31 nm/μm, −30 nm/μm, −29 nm/μm, −28 nm/μm, −27 nm/μm, −26 nm/μm, −25 nm/μm, −24 nm/μm, −23 nm/μm, −22 nm/μm, −21 nm/μm, −20 nm/μm, −19 nm/μm, −18 nm/μm, −17 nm/μm, −16 nm/μm, −15 nm/μm, −14 nm/μm, −13 nm/μm, −12 nm/μm, −11 nm/μm, or −10 nm/μm, and, in an embodiment, −40 nm/μm to −20 nm/μm, and, in an embodiment, −35 nm/μm to −25 nm/μm, where Rth denotes the out-of-plane retardation (unit: nm) of the first retardation layer at a wavelength of 550 nm, and d denotes the thickness (unit: μm) of the first retardation layer. Within this range, the polarizing plate can be easily manufactured while securing thickness uniformity in the process of forming the coating layer.

According to the present invention, the first retardation layer is formed of a composition comprising the first material satisfying the above range of Rth/d instead of a typical liquid crystal film, whereby the laminate of the first retardation layer 120 and the second retardation layer 130 has a negative Rth at a wavelength of 550 nm, thereby achieving remarkable reduction in lateral reflectivity and thickness while improving processability of the polarizing plate by omitting an adhesive layer between the first retardation layer 120 and the second retardation layer 130.

The first retardation layer 120 may be formed of a composition for the first retardation layer, which contains at least one selected from among a cellulose ester compound or a polymer thereof and an aromatic compound or a polymer thereof, described below. The first retardation layer 120 may contain at least one selected from among a cellulose ester compound or a polymer thereof and an aromatic compound or a polymer thereof, described below. The cellulose ester compound or the polymer thereof and the aromatic compound or the polymer thereof described below may be suitable for manufacture of the first retardation layer 120 according to the present invention.

The composition for the first retardation layer 120 may realize the first retardation layer 120 having Rth/d of −50 nm/μm to −10 nm/μm, and, in an embodiment, −40 nm/μm to −20 nm/μm, and, in an embodiment, −35 nm/μm to −25 nm/μm, where Rth denotes the out-of-plane retardation (unit: nm) of the first retardation layer at a wavelength of 550 nm, and d denotes the thickness (unit: μm) thereof. Within this range, the polarizing plate can be easily manufactured while securing thickness uniformity in the process of forming the coating layer.

The cellulose ester compound may include at least one selected from among a cellulose ester resin, a cellulose ester oligomer, and a cellulose ester monomer.

The cellulose ester compound may include a condensation product obtained through reaction between a hydroxyl group on a cellulose ester and carboxylic acid or carboxylic anhydride.

The cellulose ester compound may be regioselectively or randomly substituted. Regioselectivity may be measured by determining a relative degree of substitution at the positions of $C_6$, $C_3$ and $C_2$ on the cellulose ester by carbon 13 NMR. The cellulose ester compound may be prepared by a typical method through contact between a cellulose solution and at least one $C_1$ to $C_{20}$ acylation agent for a sufficient contact time to provide a cellulose ester having a desired degree of substitution and a desired degree of polymerization.

In an embodiment, the acylation agent includes at least one linear or branched $C_1$ to $C_{20}$ alkyl or aryl carboxylic anhydride, carboxylic acid halide, diketone, or acetoacetic ester. Examples of the carboxylic anhydride may include acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydride, phthalic anhydride, and isophthalic anhydride. Examples of the carboxylic acid halide may include acetyl, propionyl, butyryl, hexanoyl, 2-ethylhexanoyl, lauroyl, palmitoyl, benzoyl, substituted benzoyl, and stearoyl chlorides. Examples of the acetoacetic ester may include methyl acetoacetate, ethyl acetoacetate, propyl acetoacetate, butyl acetoacetate, and tertiary butyl acetoacetate. In an embodiment, the acylation agent includes linear or branched $C_2$ to $C_9$ alkyl carboxylic acid anhydrides, such as acetic anhydride, propionic anhydride, butyric anhydride, 2-ethylhexanoic anhydride, nonanoic anhydride, and stearic anhydride.

In an embodiment, the cellulose ester compound includes, for example, any of cellulose acetate (CA), cellulose acetate propionate (CAP), and cellulose acetate butyrate (CAB), without being limited thereto.

In an embodiment, the cellulose ester compound may include at least two acyl group substituents. At least one of the acyl groups may include an aromatic substituent and, in the cellulose ester compound, a relative degree of substitution (RDS) may be set in the order of $C_6 > C_2 > C_3$. $C_6$ means a degree of substitution at the position of the number 6 carbon in the cellulose ester, $C_2$ means a degree of substitution at the number 2 carbon in the cellulose ester, and $C_3$ means a degree of substitution at the number 3 carbon in the cellulose ester. The aromatic compound may include benzoate or substituted benzoate.

In another embodiment, the cellulose ester compound may include a regioselectively substituted cellulose ester compound having (a) a plurality of chromophore-acyl substituents, and (b) a plurality of pivaloyl substituents.

The cellulose ester compound may have a degree of hydroxyl group substitution of about 0.1 to about 1.2 and a degree of chromophore-acyl substitution of about 0.4 to about 1.6; a difference between a total sum of the degree of chromophore-acyl substitution at the number 2 carbon in the cellulose ester compound and the degree of chromophore-acyl substitution at the number 3 carbon in the cellulose ester compound and the degree of chromophore-acyl substitution at the number 6 carbon in the cellulose ester compound may be in a range from about 0.1 to about 1.6; and the chromophore-acyl may be selected from among the following (i), (ii), (iii), and (iv):

(i) ($C_6$ to $C_{20}$)aryl-acyl, where aryl is unsubstituted or substituted with 1 to 5 $R^1$s;

(ii) hetero-aryl, where hetero-aryl is a five to ten-membered ring having 1 to 4 hetero atoms selected from among N, O, and S, and is unsubstituted or substituted with 1 to 5 $R^1$s;

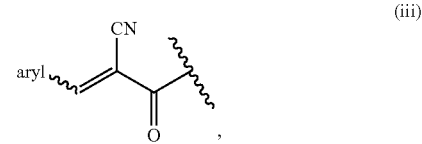

(iii)

where aryl is a $C_1$ to $C_6$ aryl and is unsubstituted or substituted with 1 to 5 $R^1$s; and

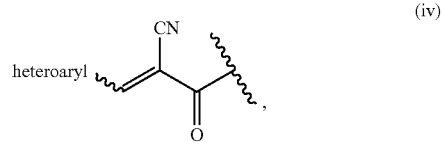

(iv)

where heteroaryl is a five to ten-membered ring having 1 to 4 hetero atoms selected from among N, O, and S, and is unsubstituted or substituted with 1 to 5 $R^1$s, $R^1$s being each independently nitro, cyano, ($C_1$ to $C_6$)alkyl, halo($C_1$ to $C_6$)alkyl, ($C_6$ to $C_{20}$)aryl-$CO_2$—, ($C_6$ to $C_{20}$)aryl, ($C_1$ to $C_6$)alkoxy, halo($C_1$ to $C_6$)alkoxy, halo, five to ten-membered heteroaryl having 1 to 4 hetero atoms selected from among N, O, and S, or

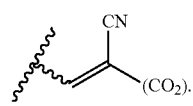

In an embodiment, the chromophore-acyl may be unsubstituted or substituted benzoyl or unsubstituted or substituted naphthyl.

In an embodiment, the chromophore-acyl may be selected from the group consisting of:

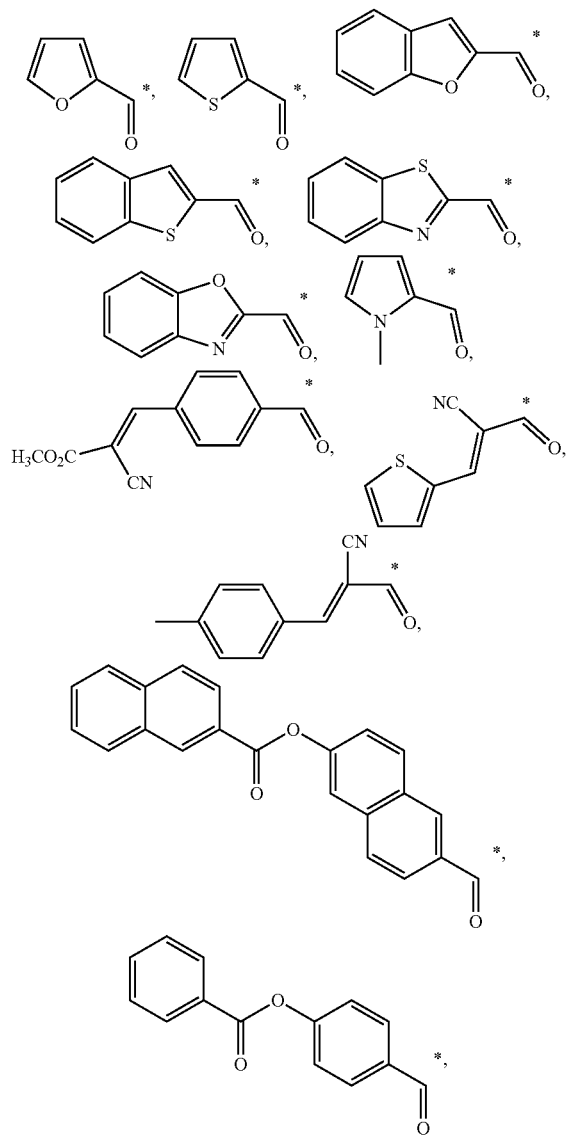

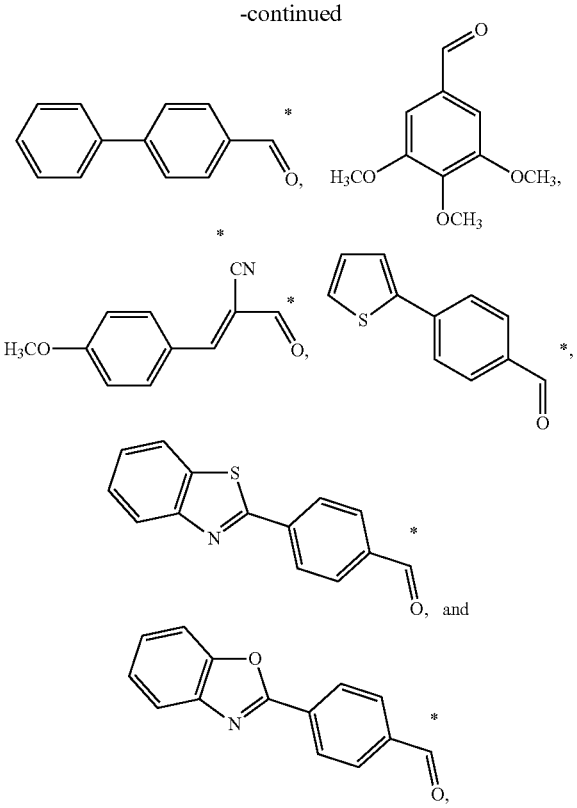

where * indicates a linking site of the chromophore-acyl substituent to oxygen of the cellulose ester.

In another embodiment, the cellulose ester compound may include an ester polymer having an acyl unit, in which at least some hydroxyl groups [a $C_2$ hydroxyl group, a $C_3$ hydroxyl group, or a $C_6$ hydroxyl group] of a sugar monomer constituting cellulose are unsubstituted or substituted, as represented by the following Formula 1:

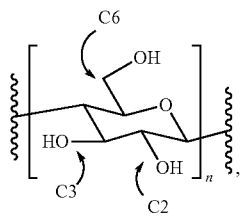

where n is an integer of 1 or more.

A substituent group for the cellulose ester polymer or the acyl unit may include at least one selected from among a halogen, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a heteroaryl group (for example, a $C_3$ to $C_{10}$ aryl group), an alkoxy group (for example, a $C_1$ to $C_{20}$ alkoxy group), an acyl group, and a halogen-containing functional group. The substituent groups may be the same as or different from each other.

Herein, "acyl" may mean R—C(=O)—* (* being a linking site, R being a $C_1$ to $C_{20}$ alkyl group, a $C_3$ to $C_{20}$ cycloalkyl group, a $C_6$ to $C_{20}$ aryl group, or a $C_7$ to $C_{20}$ arylalkyl group), as well-known in the art. The "acyl" is coupled to a ring of the cellulose through ester bonding (through an oxygen atom) in the cellulose.

Here, "alkyl," "alkenyl," "cycloalkyl," "aryl," "heteroaryl," "alkoxy," and "acyl" refer to non-halogen based compounds for convenience. The composition for the first retardation layer may include the cellulose ester polymer alone or a mixture including the cellulose ester polymer.

Here, "halogen" means fluorine (F), Cl, Br, or I, and, in an embodiment, F.

The "halogen-containing functional group" is an organic functional group containing at least one halogen and may include an aromatic, aliphatic, or alicyclic functional group. For example, the halogen-containing functional group may mean a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted acyl group, a halogen-substituted $C_6$ to $C_{20}$ aryl group, or a halogen-substituted $C_7$ to $C_{20}$ arylalkyl group, without being limited thereto.

The "halogen-substituted acyl group" may be R'—C(=O)—* (* being a linking site, R' being a halogen-substituted $C_1$ to $C_{20}$ alkyl group, a halogen-substituted $C_3$ to $C_{20}$ cycloalkyl, a halogen-substituted $C_6$ to $C_{20}$ aryl, or a halogen-substituted $C_7$ to $C_{20}$ arylalkyl). The "halogen-substituted acyl group" may be coupled to a ring of the cellulose through ester bonding (through an oxygen atom) in the cellulose.

In an embodiment, the composition for the first retardation layer includes a cellulose ester polymer substituted with an acyl group, a halogen, or a halogen-containing functional group. In an embodiment, the halogen is fluorine. In an embodiment, the halogen may be present in an amount of 1 wt % to 10 wt % in the cellulose ester polymer. Within this range, the composition allows easy formation of the positive C plate retardation layer having properties of the present invention and can improve ellipticity.

For formation of the first retardation layer, the cellulose ester polymer may be prepared by a typical method known to those skilled in the art or may be obtained from commercially available products. For example, the cellulose ester polymer having an acyl group as a substituent group may be prepared by reacting trifluoroacetic acid or trifluoroacetic anhydride with the sugar monomer constituting the cellulose represented by Formula 1 or a polymer of the sugar monomer, by reacting trifluoroacetic acid or trifluoroacetic anhydride therewith, followed by additionally reacting an acylation agent (for example, an anhydride of carboxylic acid, or carboxylic acid) therewith, or by reacting both trifluoroacetic acid or trifluoroacetic anhydride and the acylation agent therewith.

The aromatic compound includes a phenyl group and may include a polystyrene compound or a fluorobenzene or difluorobenzene structure, without being limited thereto. In an embodiment, the polystyrene compound may include a moiety represented by the following Formula 2:

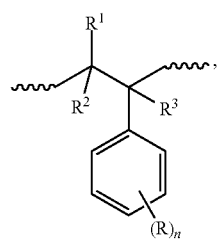

where ~~~~ is a linking site of an atom, $R^1$, $R^2$ and $R^3$ are each independently a hydrogen atom, an alkyl group, a substituted alkyl group, or a halogen; R is each independently a substituent group on a styrene ring; and n is an integer of 0 to 5 indicating the number of substituent groups on the styrene ring.

Examples of the substituent group R on the styrene ring may include an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxycarbonyl group, and a cyano group.

In an embodiment, the moiety of Formula 2 may contain a halogen.

In an embodiment, at least one of $R^1$, $R^2$, and $R^3$ may be hydrogen or a halogen, and, in an embodiment, hydrogen or fluorine.

Each of the first retardation layer 120 and the second retardation layer 130 has a slow axis and a fast axis, and lateral reflectivity and front reflectivity of the display apparatus can be further reduced by adjusting an angle between the slow axis of the first retardation layer 120 and the slow axis of the second retardation layer 130.

In an embodiment, the angle between the slow axis of the first retardation layer 120 and the slow axis of the second retardation layer 130 may be in the range of 30° to 60°, for example, 30°, 35°, 40°, 45°, 50°, 55°, or 60°, and, in an embodiment, 40° to 55°. Within this range, the polarizing plate can further improve front reflectivity and lateral reflectivity.

In an embodiment, although not shown in FIG. 1, the first retardation layer 120 may be adhesively attached to the polarizer 110 via an adhesive layer or a bonding layer. The adhesive layer may be formed of at least one of, for example, a photocurable adhesive and a pressure-sensitive adhesive (PSA), without being limited thereto. The bonding layer may be formed of a water-based bonding agent or a photocurable bonding agent, without being limited thereto.

Next, a method of forming the laminate of the first retardation layer 120 and the second retardation layer 130 will be described.

The laminate of the first retardation layer 120 and the second retardation layer 130 may be formed by coating the composition for the first retardation layer to form a coating layer on a non-stretched or partially stretched film for the second retardation layer, followed by stretching the coating layer and the non-stretched or partially stretched film for the second retardation layer.

The partially stretched film for the second retardation layer 130 may be prepared by stretching a non-stretched film for the second retardation layer in the machine direction (MD), the transverse direction (TD), or an oblique direction. The oblique direction may mean a direction of 40° to 50°, and, in an embodiment, 45° with respect to the MD of the non-stretched film for the second retardation layer. Here, the non-stretched film may be stretched to 1.5 times to 4 times, and, in an embodiment, 2 times to 3 times, an initial length thereof.

Coating of the composition for the first retardation layer may be performed by any method known to those skilled in the art. For example, coating may be performed by any of Meyer bar coating, die coating, spin coating, and the like.

A laminate of the non-stretched or partially stretched film for the second retardation layer and the coating layer may be stretched in the MD, the TD, or an oblique direction with respect to the MD of the non-stretched or partially stretched film thereof. In an embodiment, the laminate may be stretched to 1.1 times to 3 times, and, in an embodiment, 1.5 times to 2.5 times.

Stretching may be realized by dry stretching and/or wet stretching. Each of dry stretching and wet stretching may be performed by any method so long as retardation of each of the first retardation layer 120 and the second retardation layer 130 can be realized thereby.

Polarizer

The polarizer 110 serves to convert natural light or polarized light into polarized light through linear polarization in a certain direction and may be produced from a polymer film essentially containing a polyvinyl alcohol resin. In an embodiment, the polarizer 110 may be produced by dyeing the polymer film with iodine or dichroic dyes, followed by stretching the film in the MD. In an embodiment, the polarizer may be produced through swelling, dyeing, stretching, and crosslinking. In an embodiment, the polarizer 110 may include a polyene-based polarizer.

In an embodiment, the polarizer 110 may have a total light transmittance of 41% or more, for example, 41% to 45%, and a degree of polarization of 99% or more, for example, 99% to 100%. Within this range, the polarizer 110 can improve antireflection performance of the polarizing plate through combination with the first retardation layer 120 and the second retardation layer 130.

In an embodiment, the polarizer 110 may have a thickness of 30 μm or less, that is, greater than 0 μm to 30 μm, and, in an embodiment, 2 μm to 20 μm, and, in an embodiment, 4 μm to 10 μm. Within this range, the polarizer 110 can be used in the polarizing plate.

The polarizer 110 has an absorption axis and a transmission axis, in which the absorption axis corresponds to the MD of the polarizer 110 and the transmission axis corresponds to the TD of the polarizer 110.

The polarizing plate can further reduce front reflectivity and lateral reflectivity by adjusting an angle between the transmission axis of the polarizer 110 and the slow axis of the first retardation layer 120 and an angle between the transmission axis of the polarizer 110 and the slow axis of the second retardation layer 130.

In an embodiment, with reference to the transmission axis of the polarizer 110, the slow axis of the first retardation layer 120 is tilted at an angle of +5° to +25° or at an angle of −5° to −25°, and, in an embodiment, at an angle of +5° to +20° or at an angle of −20° to −5°. Within this range, the polarizing plate can reduce front reflectivity and lateral reflectivity of the display apparatus.

In an embodiment, with reference to the transmission axis of the polarizer 110, the slow axis of the second retardation layer 130 is tilted at an angle of +50° to +80° or at an angle of −80° to −50°, and, in an embodiment, at an angle of +55° to +75° or at an angle of −75° to −55°. Within this range, the polarizing plate can reduce front reflectivity and lateral reflectivity of the display apparatus.

Protective Layer

The protective layer 140 is formed on an upper surface of the polarizer 110 to protect the polarizer from an external environment while improving mechanical strength of the polarizing plate. The protective layer 140 may include a protective film or a protective coating layer.

The protective layer 140 protects the polarizer from an external environment and, in an embodiment, may be an optically transparent protective film formed of, for example, at least one resin selected from among cellulose resins including triacetylcellulose (TAC) and the like, polyester resins including polyethylene terephthalate, polybutylene terephthalate, polyethylene naphthalate (PEN), polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. In an embodiment, the protective film may be a TAC film or a PET film.

The protective coating layer may be formed of at least one of a thermosetting composition and a photocurable composition for the coating layer.

In an embodiment, the protective layer 140 may have a thickness of about 70 μm or less, that is, greater than 0 μm to 70 μm, and, in an embodiment, 5 μm to 70 μm, and, in an embodiment, 15 μm to 45 μm. Within this range, the protective layer 140 can be used in the polarizing plate.

In an embodiment, although not shown in FIG. 1, a functional coating layer may be further formed on an upper surface of the protective layer 140 to provide an additional function to the polarizing plate. For example, the functional coating layer may include any of a hard coating layer, an anti-fingerprint layer, an antireflection layer, and the like. These functional coating layers may be stacked alone or in combination thereof.

The protective layer 140 may be directly formed on the polarizer 110 or may be formed thereon via a bonding layer. The bonding layer may be formed of a water-based or UV curable bonding agent, without being limited thereto.

Although FIG. 1 shows the polarizing plate including the protective layer 140, the polarizing plate according to the present invention may omit the protective layer so long as properties of the polarizing plate are not affected by omission of the protective layer. In an embodiment, although not shown in FIG. 1, an adhesive layer or a bonding layer may be formed on a lower surface of the second retardation layer 130 to stack the polarizing plate on a panel and the like.

Next, a polarizing plate according to another embodiment will be described.

In the polarizing plate according to another embodiment, the polarizer, the first retardation layer, and the second retardation layer are sequentially stacked on the lower surface of the protective layer, as described above, and a primer layer is further formed on the upper surface of the second retardation layer.

The primer layer is formed on the upper surface of the second retardation layer. In an embodiment, the primer layer is directly formed on the upper surface of the second retardation layer to allow the first retardation layer to exhibit high adhesion to the second retardation layer. In addition, the primer layer can prevent or substantially prevent the second retardation layer from being blocked in a roll-to-roll process, thereby facilitating formation of the laminate of the second retardation layer and the first retardation layer. In particular, when the second retardation layer is a cyclic polyolefin film, which can be blocked, making it difficult to form the second retardation layer thereon by the roll-to-roll process, formation of the primer layer can improve processability upon formation of the second retardation layer.

Now, the primer layer will be described in further detail.

The primer layer may contain particles. Adjustment in size of the particles in the primer layer can improve adhesion of the first retardation layer to the second retardation layer and processability upon formation of the laminate of the first retardation layer and the second retardation layer.

In an embodiment, an average particle diameter (D50) of the particles is smaller than the thickness of the primer layer and may be in a range, for example, from 1 nm to 500 nm, and, in an embodiment, 100 nm to 300 nm. Within this range, the primer layer can prevent or substantially prevent the second retardation layer from being blocked and can improve adhesion of the first retardation layer to the second retardation layer. The particles may have a spherical or non-spherical shape, without being limited thereto. In an embodiment, the particles have a spherical shape. The particles may include at least one selected from among silicon oxide (for example, silica) and titanium oxide (for example, $TiO_2$), without being limited thereto.

In an embodiment, the particles may be present in an amount of 1 wt % to 30 wt %, and, in an embodiment, 3 wt % to 20 wt %, in the primer layer. Within this range, the primer layer can prevent or substantially prevent the second retardation layer from being blocked upon winding the second retardation layer onto a roll and can improve adhesion between the first retardation layer and the second retardation layer.

The primer layer may be formed by coating a composition including the particles and a curable resin, followed by curing. The curable resin may include at least one selected from among a thermosetting resin and a photocurable resin, without being limited thereto. For example, the curable resin may include modified or non-modified olefin resins, such as acrylic, ethylene, and propylene resins, without being limited thereto.

In an embodiment, the primer layer may have a thickness of 100 nm to 500 nm, and, in an embodiment, 150 nm to 300 nm, which is greater than the average particle diameter of the particles. Within this range, the primer layer can prevent or substantially prevent blocking of the second retardation layer, can increase adhesion of the first retardation layer, and can allow reduction in thickness of the polarizing plate.

Next, a polarizing plate according to another embodiment will be described.

The polarizing plate according to another embodiment includes the protective layer, the polarizer, the first retardation layer, and the second retardation layer, which are described above, and further includes a third retardation layer.

In an embodiment, the polarizing plate includes the polarizer, the first retardation layer, and the second retardation layer, which are sequentially stacked on the lower surface of the protective layer, as described above, and further includes the third retardation layer between the polarizer and the first retardation layer.

In another embodiment, the polarizing plate includes the polarizer, the first retardation layer, and the second retardation layer, which are sequentially stacked on the lower surface of the protective layer, as described above, and further includes the third retardation layer stacked on a lower surface of the second retardation layer.

The third retardation layer may include a positive C retardation layer, which satisfies the following Relation: $nz > nx \approx ny$ (nx, ny, and nz being indices of refraction of the third retardation layer at a wavelength of 550 nm in a slow direction, a fast direction, and a thickness direction thereof, respectively).

In an embodiment, the third retardation layer may have an out-of-plane retardation of −300 nm to 0 nm, for example, −150 nm to 0 nm, −130 nm to −10 nm, or −100 nm to −30 nm, at a wavelength of 550 nm. In an embodiment, the third retardation layer may have an in-plane retardation of 0 nm to 10 nm, for example, 0 nm to 5 nm, at a wavelength of 550 nm. Within this range, the polarizing plate can realize reduction in lateral reflectivity.

In an embodiment, the third retardation layer may be composed of a liquid crystal layer. The liquid crystal layer may be formed of any typical material known to those skilled in the art so long as the liquid crystal layer can realize the above out-of-plane retardation.

In another embodiment, the third retardation layer may be formed of the composition for the first retardation layer described above.

Figure 2:
FIG. 2 is a cross-sectional view of a polarizing plate according to another embodiment of the present invention.

Referring to the FIG. 2, the polarizing plate according to another embodiment includes a polarizer 110, a protective layer 140 stacked on an upper surface of the polarizer 110, and a first retardation layer 120, a second retardation layer 130 and a third retardation layer 150 sequentially stacked on a lower surface of the polarizer 110 in the stated order from the polarizer 110.

The polarizing plate according to the present invention may contain a light absorbent described below. The light absorbent may be present in at least one of the protective layer, the polarizer, the first retardation layer, the second retardation layer, the third retardation layer, the primer layer, the functional coating layer, the bonding layer, and the adhesive layer, which are present or may be present in the polarizing plate. In an embodiment, the light absorbent may be present as a light absorbent-containing layer in the polarizing plate.

Next, a polarizing plate according to another embodiment will be described.

The polarizing plate according to another embodiment further includes a light absorbent-containing layer. That is, the polarizing plate according to the present embodiment includes a polarizer; and a first retardation layer and a second retardation layer sequentially stacked on a lower surface of the polarizer, and further includes the light absorbent-containing layer. Details of the polarizer, the first retardation layer, and the second retardation layer may be the same as described above.

In an embodiment, the light absorbent-containing layer contains a light absorbent having a maximum absorption wavelength of 380 nm to 450 nm. Upon lamination of the first retardation layer and the second retardation layer in the polarizing plate, the light absorbent assists in improvement in black visibility at a front side. Black visibility can be measured by a typical method known to those skilled in the art. For example, a module for an optical display is fabricated by attaching the polarizing plate to an upper surface of an organic light emitting diode panel via a light absorbent-containing layer and is irradiated with light in a direction from the polarizing plate to a front side (0.05°) using a spectrophotometer DMS 803 (Instrument Systems), and light reflected and leaked from the polarizing plate and the organic light emitting diode panel is measured to obtain black visibility color values a* and b* at the front side in accordance with the CIE 1976 a*b* standard. In an embodiment, color values a* and b* are in the range of $0 \leq |a^*| + |b^*| \leq 2.5$. In an embodiment, a* may be in the range of −2.5 to 2.5 and b* may be in the range of −2.5 to 2.5. Within this range, improvement in black visibility at the front side can be confirmed.

Here, "maximum absorption wavelength" means a wavelength at which absorbance reaches the maximum when measured in a light absorbent solution diluted to a density of 10 mg/L in chloroform. In an embodiment, the light absorbent-containing layer has a maximum absorption wavelength of 380 nm to 450 nm, and, in an embodiment, 390 nm to 400 nm In an embodiment, the light absorbent-containing layer may have a light transmittance of 10% or less, for example, 0% to 10%, or 5% or less, at a wavelength of 380 nm to 450 nm. Within this range, the polarizing plate can improve visual sensitivity of reflection at the front side.

The light absorbent may be selected from among any light absorbents so long as the light absorbent can realize the above maximum absorption wavelength. In particular, the light absorbent may include at least one selected from among indole, phenyl benzotriazole, triazine, quinone, indoline, and indocyanine light absorbents. In the polarizing plate according to the present invention, these light absorbents can further improve black visibility at the front side.

In an embodiment, the light absorbent may be present in an amount of 0.001 wt % to 6 wt %, for example, 0.1 wt % to 6 wt %, and, in an embodiment, 0.3 wt % to 5 wt %, in the light absorbent-containing layer. Within this range, the light absorbent can improve black visibility at the front side and reliability without bleeding out or affecting retardation values of the first retardation layer and the second retardation layer.

The light absorbent-containing layer may be an adhesive layer or a non-adhesive layer depending upon the kind of base resin forming the light absorbent-containing layer. In an embodiment, the light absorbent-containing layer may be an adhesive layer, through which the polarizing plate can be attached to a panel or the like.

In an embodiment, the light absorbent-containing layer may have a thickness of 20 μm or less, that is, greater than 0 μm to 20 μm, and, in an embodiment, 1 μm to 20 μm, or 5 μm to 15 μm. Within this range, the light absorbent-containing layer can be used in the polarizing plate.

The light absorbent-containing layer may be formed on an upper surface of the protective layer, between the polarizer and the protective layer, between the polarizer and the first retardation layer, between the first retardation layer and the second retardation layer, and/or on a lower surface of the second retardation layer.

Figure 3:
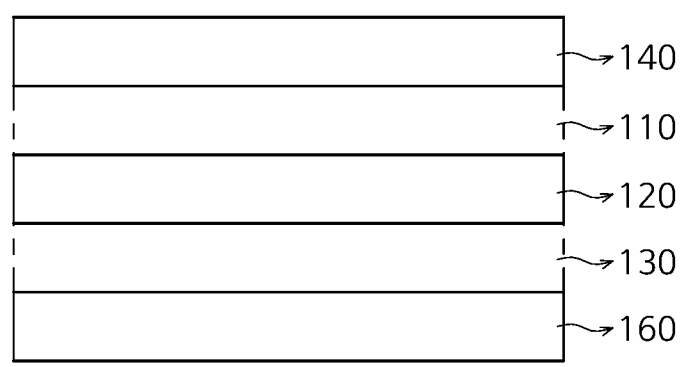
FIG. 3 is a cross-sectional view of a polarizing plate according to another embodiment of the present invention.

Referring to the FIG. 3, the polarizing plate according to another embodiment includes a polarizer 110, a protective layer 140 stacked on an upper surface of the polarizer 110, and a first retardation layer 120, a second retardation layer 130 and a light absorbent-containing layer 160 sequentially stacked on a lower surface of the polarizer 110 in the stated order from the polarizer 110.

An optical display according to one or more embodiments of the present invention may include the polarizing plate according to any of the embodiments of the present invention. For example, the optical display may include any of organic light emitting diode (OLED) displays and liquid crystal displays.

In an embodiment, the OLED display may include: an OLED panel including a flexible substrate; and the polarizing plate according to an embodiment of the present invention stacked on the OLED panel.

In another embodiment, the OLED display apparatus may include: an OLED panel including a non-flexible substrate; and the polarizing plate according to an embodiment of the present invention stacked on the OLED panel.

Next, the present invention will be described in further detail with reference to some examples. However, it should be noted that these examples are provided for illustration and should not be construed in any way as limiting the invention.

Example 1

A polyvinyl alcohol film (PS #60, pre-stretching thickness: 60 μm, Kuraray Co., Ltd., Japan) was stretched to 6 times an initial length thereof in an aqueous solution of iodine at 55° C., thereby providing a thick polarizer having a transmittance of 43%.

A coating was formed by depositing a composition for the first retardation layer (non-liquid crystalline composition comprising a fluorine-containing polystyrene compound, negative (−) birefringence, Eastman Co., Ltd.) to a predetermined thickness on an upper surface of a cyclic polyolefin (COP) film (ZD film, positive (+) birefringence, Zeon Co., Ltd.) obliquely stretched at an angle of 45°, followed by drying. The composition could realize Rth/d=−26 nm/μm.

A laminate of the coating and the COP film was stretched in the MD of the COP film, thereby preparing a laminate of the first retardation layer and the second retardation layer, in which the second retardation layer is stacked on a lower surface of the first retardation layer.

A polarizing plate was fabricated by sequentially stacking the polarizer and a protective film (triacetylcellulose film, KA25-HC, Fuji film Co., Ltd.) on an upper surface of the first retardation layer in the stated order from the first retardation layer. An angle between axes of the polarizing plate is shown in Table 1.

Examples 2 to 4

Polarizing plates were fabricated in the same manner as in Example 1 except that the retardation and/or the thickness of each of the first retardation layer and the second retardation layer were changed as listed in Table 1 while forming the first retardation layer using the same material as that of Example 1.

Example 5

A polarizing plate was fabricated in the same manner as in Example 1 except that a third retardation layer (positive C layer, Re=0.2 nm and Rth=−30 nm at 550 nm) was additionally stacked on the lower surface of the second retardation layer.

Example 6

A composition comprising a (meth)acrylic adhesive resin, a light absorbent (maximum absorption wavelength: 391 nm, Bonasorb UA3912, indole compound, Orient Chemical Co., Ltd.) and an isocyanate curing agent (Coronate L) was prepared.

A polarizing plate was fabricated in the same manner as in Example 1 except that a light absorbent-containing layer (thickness: 10 μm, the content of the light absorbent: 1.25 wt % in the light absorbent-containing layer) was further formed by coating the prepared composition to a predetermined thickness on the lower surface of the second retardation layer, followed by curing the composition.

Comparative Example 1

A first retardation layer was formed using a liquid crystal film (negative birefringence, thickness: 2 μm, Fuji Film Co., Ltd.), a second retardation layer was formed using a liquid crystal film (positive birefringence, thickness: 2 μm, Fuji Film Co., Ltd.), and an adhesive layer (thickness: 6.5 μm) was formed using a (meth)acrylic adhesive resin.

Then, a polarizing plate was fabricated in the same manner as in Example 1 except that the protective film, the polarizer, the liquid crystal film for the first retardation layer, the adhesive layer (thickness: 6.5 μm), and the liquid crystal film for the second retardation layer were sequentially stacked in the stated order.

Comparative Example 2

A laminate including a retardation layer (second retardation layer) on a lower surface of a cyclic polyolefin film (first retardation layer) was prepared by coating a composition for retardation layers (comprising a fluorine-containing cellulose compound, negative birefringence) to a predetermined thickness on the lower surface of the cyclic polyolefin (COP) film (ZD film, positive birefringence, Zeon Co., Ltd.) obliquely stretched at an angle of 70°, followed by drying and obliquely stretching the laminate with reference to the MD of the film. The composition for retardation layers could realize Rth/d=−5.7 nm/μm.

A polarizing plate was fabricated in the same manner as in Example 1 by attaching the polarizer and a triacetylcellulose film as a protective film to an upper surface of the cyclic polyolefin film.

Comparative Example 3

A polarizing plate was fabricated in the same manner as in Example 1 except that the material (liquid crystals of negative birefringence, Fuji Film Co., Ltd.), the retardation and the thickness of the second retardation layer were changed as listed in Table 1 and an adhesive layer (thickness: 6.5 μm) was formed using a (meth)acrylic adhesive resin between the first retardation layer and the second retardation layer while forming the first retardation layer using the same material as that of Example 1.

Comparative Example 4

A polarizing plate was fabricated in the same manner as in Example 1 by sequentially stacking a protective film, a polarizer, a first retardation layer, an adhesive layer, and a second retardation layer except that the material (polymer film having positive birefringence, Zeon Co., Ltd.), the retardation, and the thickness of each of the second retardation layer and the first retardation layer were changed as listed in Table 1 and an adhesive layer (thickness: 6.5 μm) was formed using a (meth)acrylic adhesive resin.

Retardations Re, Rth, and NZ of each of the first to third retardation layers were measured at a wavelength of 550 nm using an Axoscan polarimeter (AxoMetric Co., Ltd.).

Each of the polarizing plates fabricated in the Examples and Comparative Examples was evaluated as to the following properties. Results are shown in Table 1.

(1) Degree of circular polarization (unit: %): Degree of circular polarization was measured by allowing light to pass through the polarizing plate at a front side (0°) using an Axoscan polarimeter. Then, the degree of circular polarization was measured by allowing light to pass through the polarizing plate at a lateral side (60°) while rotating the polarimeter 360 degrees. Results are shown in Table 1.

(2) Reflectivity (unit: %): Reflectivity was measured using a goniometer (DMS 803, Instrument Systems Inc. (Konica Minolta Group), Japan). After measurement with respect to a white plate provided to the goniometer, luminance and contrast were measured using an angular scanning function. Each of the polarizing plates fabricated in the Examples and Comparative Examples was attached to a flexible panel (P30Pro, Huawei Co., Ltd.) via a pressure-sensitive adhesive, followed by measurement of front and lateral reflectivity. Here, theta was measured at intervals of 5° and reflectivity was determined by obtaining spectral transmittance/reflectance (SCE) values for incident light from the front side (0°) and the lateral side (60°).

TABLE 1

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| First retardation layer | Kind | Polymer (−) | Polymer (−) | Polymer (−) | Polymer (−) | Polymer (−) | Polymer (−) | Polymer (−) | Polymer (+) | Polymer (−) | Polymer (+) |
| | Re | 150 | 160 | 165 | 165 | 150 | 150 | 240 | 150 | 150 | 150 |
| | Rth | −85 | −100 | −120 | −130 | −85 | −85 | −140 | 85 | −85 | 85 |
| | NZ | −0.1 | −0.1 | −0.2 | −0.3 | −0.1 | −0.1 | −0.1 | 1.1 | −0.1 | 1.1 |
| | Rth/d | −26 | −28 | −33 | −35 | −26 | −26 | −70 | 21 | −28 | 2 |
| | Thickness | 3 | 4 | 4 | 4 | 3 | 3 | 2 | 4 | 3 | 43 |
| | Dispersion | Positive | Positive | Positive | Positive | Positive | Positive | Positive | Positive | Positive | Positive |
| Second retardation layer | Kind | Polymer (+) | Polymer (+) | Polymer (+) | Polymer (+) | Polymer (+) | Polymer (+) | Liquid crystal (+) | Polymer (−) | Liquid crystal (−) | Polymer (+) |
| | Re | 90 | 90 | 90 | 95 | 90 | 90 | 120 | 90 | 90 | 90 |
| | Rth | 57 | 59 | 61 | 62 | 57 | 57 | 59 | −57 | −50 | 57 |
| | NZ | 1.1 | 1.2 | 1.2 | 1.2 | 1.1 | 1.1 | 1.0 | −0.1 | −0.1 | 1.1 |
| | Thickness | 15 | 15 | 15 | 16 | 15 | 15 | 2 | 10 | 2 | 40 |
| | Dispersion | Positive | Positive | Positive | Positive | Positive | Positive | Positive | Positive | Positive | Positive |
| Adhesive layer | | Absent | Absent | Absent | Absent | Absent | Absent | Present | Absent | Present | Present |
| Third retardation layer (Rth) | | Absent | Absent | Absent | Absent | −30 | Absent | Absent | Absent | Absent | Absent |
| Angle 1 | | +15 | +15 | +15 | +14 | +15 | +15 | +17 | +15 | +15 | +15 |
| Angle 2 | | +64 | +65 | +66 | +64 | +64 | +64 | +77 | +64 | +64 | +64 |
| Total Rth | | −28 | −41 | −59 | −68 | −28 | −28 | −81 | 28 | −135 | 142 |
| Circular polarization | | 68 | 70 | 66 | 65 | 72 | 68 | 63 | 50 | 53 | 48 |
| Reflectivity | @ Front side | 0.2 | 0.2 | 0.23 | 0.25 | 0.20 | 0.21 | 0.2 | 0.3 | 0.35 | 0.38 |
| | @ Lateral side | 0.43 | 0.4 | 0.5 | 0.52 | 0.42 | 0.48 | 0.43 | 1.3 | 1.5 | 2.7 |

Angle 1: Angle between the slow axis of the first retardation layer and the transmission axis of the polarizer.
Angle 2: Angle between the slow axis of the second retardation layer and the transmission axis of the polarizer.
Total Rth: Rth of the laminate stacked on the lower surface of the polarizing plate at a wavelength of 550 nm.
(−): negative birefringence, (+): positive birefringence.
Rth/d: Rth/d of the first retardation layer.

As shown in Table 1, the polarizing plates according to the present invention exhibited significantly low front and lateral reflectivity and achieved thickness reduction and good processability through elimination of an adhesive layer. Conversely, the polarizing plates of the Comparative Examples had high front and lateral reflectivity and suffered from low processability due to the presence of the adhesive layer.

Accordingly, the present invention provides a polarizing plate that has a good effect in thickness reduction while significantly reducing front reflectivity and lateral reflectivity. Further, the present invention provides a polarizing plate that secures good processability. Further, the present invention provides a polarizing plate that can improve black visibility. Further, the present invention provides an optical display including the above-described polarizing plate.

Although some embodiments have been described herein, it is to be understood that various modifications, changes, alterations, and equivalent embodiments can be made by those skilled in the art without departing from the spirit and scope of the present invention.

What is claimed is:

1. A polarizing plate comprising:
   a polarizer; and a first retardation layer and a second retardation layer sequentially stacked on a first surface of the polarizer,
   wherein the first retardation layer has a degree of biaxiality (NZ) of greater than or equal to −2 and less than 0 at a wavelength of 550 nm and is a non-liquid crystal layer, and the second retardation layer has a degree of biaxiality (NZ) of greater than 1 and less than or equal to 2 at a wavelength of 550 nm, and
   wherein a laminate of the first retardation layer and the second retardation layer or a laminate comprising the first retardation layer and the second retardation layer is stacked on the first surface of the polarizer and has an out-of-plane retardation (Rth) of −80 nm to −20 nm at a wavelength of 550 nm.

2. The polarizing plate according to claim 1, wherein the first retardation layer has a greater absolute out-of-plane retardation (Rth) at a wavelength of 550 nm than the second retardation layer.

3. The polarizing plate according to claim 1, wherein the first retardation layer has an out-of-plane retardation (Rth) of −250 nm to −50 nm at a wavelength of 550 nm, and the second retardation layer has an out-of-plane retardation (Rth) of 40 nm to 150 nm at a wavelength of 550 nm.

4. The polarizing plate according to claim 1, wherein the first retardation layer has a greater absolute in-plane retardation (Re) at a wavelength of 550 nm than the second retardation layer.

5. The polarizing plate according to claim 1, wherein the first retardation layer has an in-plane retardation (Re) of 100 nm to 270 nm at a wavelength of 550 nm, and the second retardation layer has an in-plane retardation (Re) of 70 nm to 160 nm at a wavelength of 550 nm.

6. The polarizing plate according to claim 1, wherein the first retardation layer has negative (−) birefringence, and the second retardation layer has positive (+) birefringence.

7. The polarizing plate according to claim 1, wherein the first retardation layer has Rth/d of −50 nm/μm to −10 nm/μm, where Rth is an out-of-plane retardation (unit: nm) of the first retardation layer at a wavelength of 550 nm, and d is a thickness (unit: μm) of the first retardation layer.

8. The polarizing plate according to claim 1, wherein the first retardation layer exhibits positive dispersion, and the second retardation layer exhibits positive dispersion.

9. The polarizing plate according to claim 1, wherein the first retardation layer has a thickness of 15 μm or less, and the second retardation layer has a thickness of 10 μm or more.

10. The polarizing plate according to claim 1, wherein the first retardation layer comprises at least one selected from among a cellulose ester compound or a polymer thereof and an aromatic compound or a polymer thereof.

11. The polarizing plate according to claim 10, wherein the aromatic compound comprises a polystyrene compound comprising a moiety represented by the following Formula 2:

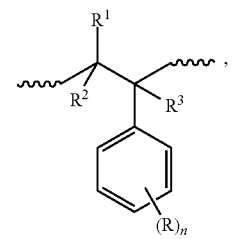

where ⁓⁓⁓⁓ is a linking site of an atom;
$R^1$, $R^2$, and $R^3$ are each independently a hydrogen atom, an alkyl group, a substituted alkyl group, or a halogen;
R is each independently a substituent group on a styrene ring; and
n is an integer of 0 to 5 indicating the number of substituent groups on the styrene ring.

12. The polarizing plate according to claim 11, wherein the moiety of Formula 2 comprises a halogen.

13. The polarizing plate according to claim 1, wherein the first retardation layer is directly formed on a first surface of the second retardation layer without an adhesive layer therebetween, the first surface of the second retardation layer facing the first surface of the polarizer.

14. The polarizing plate according to claim 1, wherein the second retardation layer is a non-liquid crystal layer.

15. The polarizing plate according to claim 1, wherein the polarizer has a slow axis tilted at an angle of +5° to +25° or at an angle of −25° to −5° with reference to a transmission axis of the polarizer, and the second retardation layer has a slow axis tilted at an angle of +50° to +80° or at an angle of −80° to −50° with reference to the transmission axis of the polarizer.

16. The polarizing plate according to claim 1, further comprising a protective layer on a second surface of the polarizer that faces away from the first surface.

17. The polarizing plate according to claim 1, further comprising a third retardation layer comprising a positive C layer having an out-of-plane retardation (Rth) of −300 nm to 0 nm at a wavelength of 550 nm.

18. The polarizing plate according to claim 17, wherein the third retardation layer is stacked between the polarizer and the first retardation layer or on a surface of the second retardation layer that faces away from the first retardation layer.

19. The polarizing plate according to claim 1, further comprising: a light absorbent-containing layer.

20. The polarizing plate according to claim 19, wherein the light absorbent-containing layer contains 0.001 wt % to 6 wt % of a light absorbent having a maximum absorption wavelength of 380 nm to 450 nm.

21. The polarizing plate according to claim 19, wherein the light absorbent-containing layer is on a first surface of a protective layer that is on a second surface of the polarizer that faces away from the first surface of the polarizer, between the polarizer and the protective layer, between the polarizer and the first retardation layer, between the first retardation layer and the second retardation layer, and/or on a surface of the second retardation layer that faces away from the first retardation layer.

22. An optical display comprising the polarizing plate according to claim 1.

* * * * *